(12) United States Patent
Kim et al.

(10) Patent No.: US 7,986,924 B2
(45) Date of Patent: Jul. 26, 2011

(54) IMPEDANCE CONTROL APPARATUS AND METHOD FOR PORTABLE MOBILE COMMUNICATION TERMINAL

(75) Inventors: Hong Teuk Kim, Seoul (KR); Kwy Ro Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 937 days.

(21) Appl. No.: 11/980,502

(22) Filed: Oct. 31, 2007

(65) Prior Publication Data

US 2009/0109880 A1 Apr. 30, 2009

(51) Int. Cl.
*H04B 1/02* (2006.01)

(52) U.S. Cl. ............ 455/107; 455/320; 455/248.1; 455/330; 455/115.1; 455/115.2; 455/115.3; 455/115.4; 375/315; 343/820; 343/822; 343/850; 343/852; 343/860

(58) Field of Classification Search ............ 455/78, 455/107, 248.1, 320, 73, 75, 83, 115, 330, 455/115.1, 115.3; 375/219, 295, 316, 260, 375/224, 345, 220, 315; 343/703, 860, 863, 343/862, 861, 850, 852, 820, 822; 370/464, 370/442

See application file for complete search history.

(56) References Cited

U.S. PATENT DOCUMENTS

| | | | |
|---|---|---|---|
| 6,198,441 B1 * | 3/2001 | Okabe et al. ............ | 343/702 |
| 6,466,774 B1 * | 10/2002 | Okabe et al. ............ | 455/150.1 |
| 6,961,368 B2 * | 11/2005 | Dent et al. ............ | 375/219 |
| 7,408,379 B2 * | 8/2008 | Cho et al. ............ | 326/30 |
| 2002/0101907 A1 * | 8/2002 | Dent et al. ............ | 375/132 |
| 2004/0104785 A1 * | 6/2004 | Park et al. ............ | 333/33 |
| 2006/0079194 A1 * | 4/2006 | Tired et al. ............ | 455/283 |
| 2007/0063767 A1 * | 3/2007 | Das ............ | 330/51 |
| 2008/0242235 A1 * | 10/2008 | Adler et al. ............ | 455/73 |
| 2009/0068963 A1 * | 3/2009 | Cabanillas et al. ............ | 455/83 |

* cited by examiner

*Primary Examiner* — Lewis G West
*Assistant Examiner* — April G Gonzales
(74) *Attorney, Agent, or Firm* — Birch, Stewart, Kolasch & Birch, LLP (57) ABSTRACT

An impedance control apparatus and method for portable mobile communication terminal is disclosed capable of accurately adjusting impedances relative to environment when the portable mobile communication terminal is being used, wherein an impedance of a first variable impedance matching part is varied to receive a reception impedance correction signal transmitted by a base station and to detect a reception strength, an impedance of the first variable impedance matching part is set by a impedance value of the largest reception strength out of the reception strengths, the portable mobile communication terminal varies the impedance of a second variable impedance matching part to transmit a transmission impedance correction signal to a base station and to allow the base station to detect the reception strength, and the impedance setting of the second variable impedance matching part is performed using the reception strength detected by the base station.

15 Claims, 7 Drawing Sheets

IMPEDANCE CONTROL APPARATUS AND METHOD FOR PORTABLE MOBILE COMMUNICATION TERMINAL

TECHNICAL FIELD

The following description relates generally to an impedance control apparatus and method for portable mobile communication terminal, and more particularly to an impedance control apparatus and method for portable mobile communication terminal whereby impedance is controlled to improve a transmission power of a transmission signal transmitted to air via an antenna and a sensitivity of a reception signal received by a receiver.

BACKGROUND ART

Development of information communication technologies, changes of life styles and economic growth have changed shapes of communication culture at a galloping pace. In information age, mobile communication systems capable of receiving communication services in the underground, air, on the seas and even in the mountain areas regardless of time and place resultant from high demand on transmission of high speed information have been placed communication media indispensable to every day life.

In the mobile communication systems, portable mobile communication terminals such as mobile communication terminals which may be hand-held by a user for communication are structurally miniaturized for easy use and portability.

The portable mobile communication terminals may functionally support multi-bands such as WCDMA (Wide-band Code-Division Multiple Access) and GSM (Global System for Mobile communication). Furthermore, the portable mobile communication terminals may support multimedia such as Bluetooth, DBM (Digital Multimedia Broadcasting) and DVB-H (Digital Video Broadcasting-Handheld). Complicated built-in structure of many functions crammed inside the portable mobile communication terminals has generated lots of interferences among various circuits intrinsically mounted in the portable mobile communication terminals. Antennae are miniaturized or fitted inside the portable mobile communication terminals to make the portable mobile communication terminals small.

A problem associated with environment surrounding use of the portable mobile communication terminals is that impedance mismatching is generated even if impedances are accurately adjusted during manufacturing of portable mobile communication terminals among an antenna, a duplexer, a receiver and a transmitter mounted inside the portable mobile communication terminal to make it very difficult to embody an excellent transmission/reception performances.

To be more specific, portable mobile communication terminals come in various styles including a slide type capable of sliding up and down a slide part and a folder (so-called clamshell) type capable of opening and closing a folder. In use, a body of a portable mobile communication terminal is typically held by hand and a speaker position thereof is tightly contacted to an ear.

In other words, the impedance mismatching occurs in association with environment relative to use of the portable mobile communication terminal where a slide part of a portable mobile communication terminal is slid up or down, a folder is opened or closed, or a speaker position of the portable mobile communication terminal is closely contacted to an ear of a user.

The impedance mismatching mainly occurs between a duplexer and a receiver, and a duplexer and a transmitter. Furthermore, the impedance mismatching is also generated between an antenna and a duplexer.

The impedance mismatching may lower a maximum transmission power of a transmission signal transmitted to the air by a transmitter of a portable mobile communication terminal through a duplexer and an antenna. The impedance mismatching also degrade the sensitivity of a reception signal received by a receiver through the antenna and the duplexer to generate a call drop phenomenon at a blocking area. It is therefore essential that a technique to address or obviate the drawback of impedance mismatching in a portable mobile communication terminal generated in association with usage environment be urgently developed.

SUMMARY

An object of the present disclosure is to provide an impedance control apparatus and method for portable mobile communication terminal whereby an impedance mismatching in a portable mobile communication terminal generated in association with usage environment of the portable mobile communication terminal between a duplexer and a receiver and between a duplexer and a transmitter can be obviated.

Another object is to provide an impedance control apparatus and method for portable mobile communication terminal whereby an impedance mismatching generated between an antenna and a duplexer can be reduced.

In one general aspect, first and second variable impedance matching parts are respectively mounted between a duplexer and a receiver, and between a duplexer and a transmitter. A third variable impedance matching part is mounted between an antenna and a duplexer. The first, second and third variable impedance matching parts are all so configured as to vary input and output impedances.

Furthermore, when in use of a portable mobile communication terminal, impedances of the first, second and third variable impedance matching parts are respectively set to match impedances between an antenna and a duplexer, between a duplexer and a receiver, and between a duplexer and a transmitter.

The impedance setting of the first variable impedance matching part is performed in such a fashion that the portable mobile communication terminal transmits a reception impedance control request signal to a base station and the base station transmits a reception impedance correction signal having predetermined amplitude and frequency in response to the transmitted reception impedance control request signal. The portable mobile communication terminal varies the impedance of the first variable impedance matching part to receive the reception impedance correction signal and to determine the reception strength of the received reception impedance correction signal. Furthermore, the impedance of the first variable impedance matching part is controlled by an impedance of the strongest reception strength out of the determined reception impedance correction signals.

The impedance setting of the second variable impedance matching part is performed in such a manner that the portable mobile communication terminal transmits a transmission impedance control request signal to the base station, and varies the impedance of the second variable impedance matching part to transmit a transmission impedance correction signal that contains a tone signal having predetermined amplitude and frequency, and the varied impedance value of the second variable impedance matching part. The base station receives the transmission impedance correction signal in response to the transmission impedance control request signal to detect reception strength, and matches the detected reception strength to each impedance value contained in the transmission impedance correction signal and transmits to the portable mobile communication terminal.

The portable mobile communication terminal receives the reception strength and the impedance value transmitted by the base station and performs the impedance setting of the second variable impedance matching part by the impedance value matched to the strongest reception out of the received reception strengths.

The impedance setting of the third variable impedance matching part is performed in such a way that impedance of the third variable impedance matching part is simultaneously varied when the first variable impedance matching part is impedance-set to receive the reception impedance correction signal and to set the third variable impedance matching part.

The impedance setting of the third variable impedance matching part is performed in such a manner that the portable mobile communication terminal simultaneously conducts the impedance setting of the third variable impedance matching part when the impedance setting of the second variable impedance matching part is conducted, and inserts an impedance value of the third variable impedance matching part to the transmission impedance correction signal and transmits the value to the base station to thereby perform the impedance setting of the third variable impedance matching part.

In one general aspect, an impedance control apparatus for a portable mobile communication terminal comprises: a duplexer separating a transmission signal and a reception signal transmitted to and received from an antenna; a receiver receiving the reception signal separated by the duplexer; a transmitter converting the transmission signal to a radio frequency (RF) signal and outputting the signal to the duplexer; a first variable impedance matching part disposed between the duplexer and the receiver; a second variable impedance matching part disposed between the duplexer and the transmitter; and a microprocessor controlling in such a manner that impedances of the first and second impedance matching parts are varied to be matched.

In another general aspect, an impedance control apparatus for a portable mobile communication terminal comprises: a duplexer separating a transmission signal and a reception signal transmitted to and received from an antenna; a receiver receiving the reception signal separated by the duplexer; a transmitter converting the transmission signal to a radio frequency signal and outputting the signal to the duplexer; a first variable impedance matching part disposed between the duplexer and the receiver; a second variable impedance matching part disposed between the duplexer and the transmitter; a third variable impedance matching part disposed between the antenna and the duplexer to match impedance; and a microprocessor controlling in such a manner that impedances of the first, second and third impedance matching parts are varied to be matched.

In still another general aspect, an impedance control method for a portable mobile communication terminal comprises: varying, by a microprocessor, impedance of a first variable impedance matching part to set the impedance of the first variable impedance matching part in response to a reception impedance correction signal received from a base station; and varying, by the microprocessor, impedance of a second variable impedance matching part to transmit a transmission impedance correction signal to a base station and setting the impedance of the second variable impedance matching part in response to a signal returned from the base station.

In still another general aspect, an impedance control method for a portable mobile communication terminal comprises: varying, by a microprocessor, impedances of first and third variable impedance matching parts to determine a reception strength of a received reception impedance correction signal and to set impedances of first and third variable impedance matching parts; varying, by the microprocessor, the impedance of the second variable impedance matching part to transmit a transmission impedance correction signal to a base station and to set the impedance of the second variable impedance matching part in response to a signal returned from the base station.

In still further general aspect, an impedance control method for a portable mobile communication terminal comprises: varying, by a microprocessor, impedances of second and third variable impedance matching parts to transmit a transmission impedance correction signal to a base station and to set impedances of the second and third variable impedance matching parts in response to a signal returned from the base station; and varying, by the microprocessor, the impedance of the first variable impedance matching part to determine a reception strength of a received reception impedance correction signal and to set the impedance of the first variable impedance matching part.

In still further general aspect, a portable mobile communication terminal comprises: an antenna receiving and transmitting RF signals; a receiver receiving an RF reception signal separated by the duplexer; a transmitter converting the base band transmission signal to an RF signal and outputting the RF signal to the duplexer; variable impedance matching parts which can be disposed at least one among between the duplexer and the receiver, between the duplexer and the transmitter, between antenna and the duplexer; and a microprocessor controlling the optimal impedances of the variable impedance matching part through mutual communication between a portable mobile communication terminal and base station.

BRIEF DESCRIPTION OF THE DRAWINGS

Reference will now be made in detail to the present exemplary implementations, examples of which are illustrated in the accompanying drawings, and the examples of which are not restrictive of the present disclosure. Wherever possible, the same reference numbers will be used throughout the drawings to refer to the same or like parts.

DETAILED DESCRIPTION

Other objects, advantages, and salient features of the disclosure will become apparent to those skilled in the art from the following detailed description, which, taken in conjunction with the annexed drawings, discloses exemplary implementations. Furthermore, the principle and concept of the instant disclosure are provided to easily explain the purpose in the most useful manner.

Figure 1:
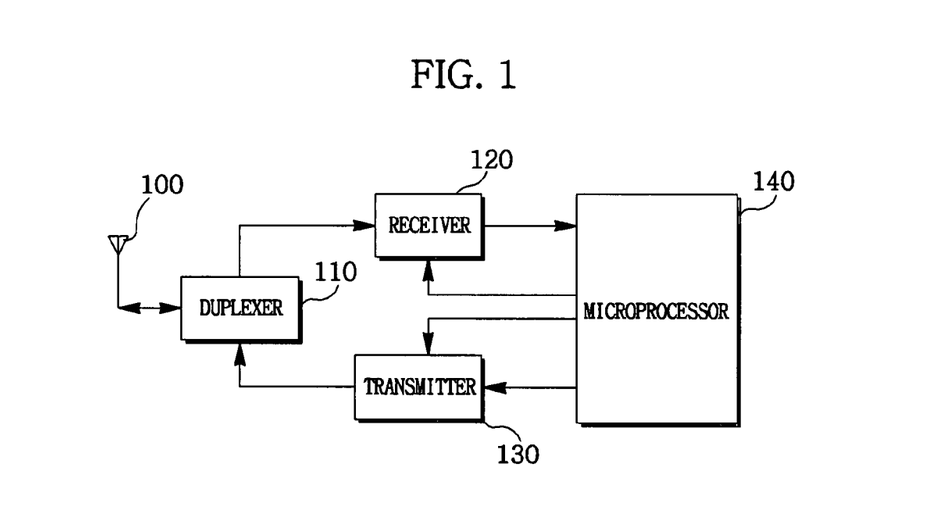
FIG. 1 is a block diagram illustrating a portable mobile communication terminal according to prior art.

Referring to FIG. 1, a portable mobile communication terminal typically includes an antenna (100), a duplexer (110), a receiver (120), a transmitter (130) and a microprocessor (140).

The duplexer (110) may separate a reception signal of RF received via the antenna (100) and input the signal to the receiver (120). The duplexer (110) may also transmit a transmission signal of RF outputted by the transmitter (130) to the antenna (100) and transmits the transmission signal. The duplexer may be full duplexer such as a FBAR/SAW duplexer and half duplexer such as a Tx-Rx switch.

The receiver (120) may receive the reception signal of RF separated by the duplexer (110) and convert the signal to a base band signal. The transmitter (130) may convert the transmission signal of inputted base band signal to a frequency signal and output to the duplexer (110) for transmission.

The microprocessor (140) may receive the base band signal outputted by the receiver and provide a to-be-transmitted base band signal to the transmitter (130) and control an operation of the portable mobile communication terminal.

For example, the microprocessor (140) may output to a telephone communication part (not shown) the base band signal inputted from the receiver (120), and output to the transmitter (130) a telephone communication voice signal of a user outputted by the telephone communication part to thereby control in such a manner that the user of the portable mobile communication terminal can make a telephone call.

In the portable mobile communication terminal thus described, an accurate matching of impedances of the duplexer (110) and the receiver (120) enables the receiver (120) to receive a reception signal separated by the duplexer (110)) with a high sensitivity. Furthermore, an accurate matching of impedances of the duplexer (110) and the transmitter (130) enables the antenna (100) to transmit a transmission signal outputted by the transmitter (130) with a maximum transmission power.

To this end, impedances of the duplexer (110) and the receiver (120), and impedances of the duplexer (110) and the transmitter (130) are accurately matched in the manufacturing process of portable mobile communication terminals.

Typically, antennae are miniaturized or intrinsically installed inside portable mobile communication terminals to make the portable mobile communication terminals small. In use, a slider part is slid up or down in a slide type portable mobile communication terminal while a folder is opened or closed in a folder type portable mobile communication terminal. In use, a body of a portable mobile communication terminal is typically held by hand and a speaker position thereof is tightly contacted to an ear.

As a result of the typical use habit of portable mobile communication terminals, there occurs an impedance mismatching between the duplexer (110) and the receiver (120), and between the duplexer (120) and the transmitter (130), even if impedances of the duplexer (110) and the receiver (120), and those of the duplexer (120) and the transmitter (130) are precisely matched in the manufacturing process of portable mobile communication terminals.

The impedance mismatching thus generated tends to lower the maximum transmission power of a transmission signal transmitted by the portable mobile communication terminals and become a cause of deteriorating a reception sensitivity of a reception signal.

Figure 2:
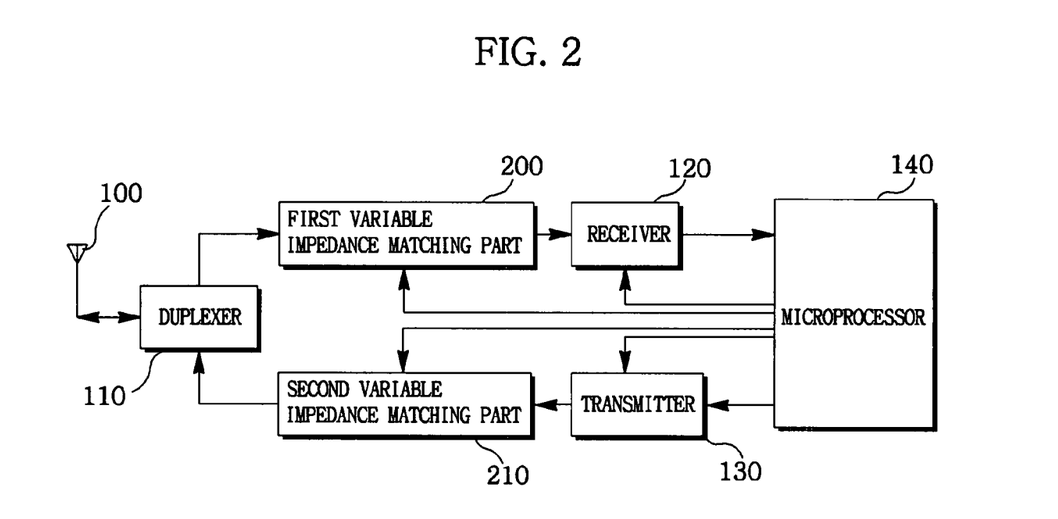
FIG. 2 is a block diagram illustrating a portable mobile communication terminal mounted with an impedance control device according to an exemplary implementation.

Now, referring to FIG. 2, an impedance control apparatus may include an antenna (100), a duplexer (110), a receiver (120), a transmitter (130) and a microprocessor (140), wherein a first variable impedance matching part (200) may be disposed between the duplexer (110) and the receiver (120), and a second variable impedance matching part (210) may be formed between the duplexer (110) and the transmitter (130). Furthermore, the impedances of the first and second variable impedance matching parts (200, 210) may be variably controlled by the control of the microprocessor (140).

Figure 3:
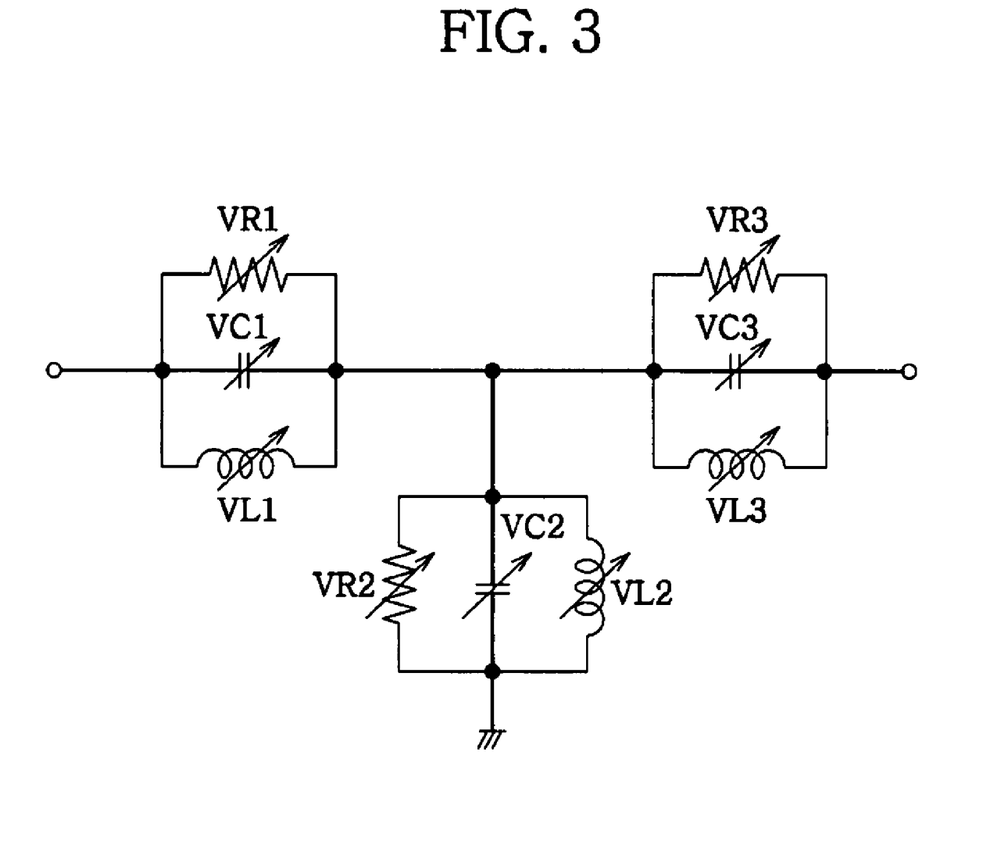
FIG. 3 is a circuit diagram illustrating first and second variable impedance matching parts in an impedance control device.

Each of the first and second variable impedance matching parts (200, 210) may be formed in parallel with, for example, a plurality of variable resistors (VR1, VR2, VR3), a plurality of variable capacitors (VC1, VC2, VC3), a plurality of variable inductors (VL1, VL2, VL3). The parallel-connected variable resistor (VR1), the variable capacitor (VC1) and the variable inductor (VL1) and the parallel-connected variable resistor (VR2), the variable capacitor (VC2) and the variable inductor (VL2) are respectively connected in series.

A variable resistor (VR3), a variable capacitor (VC3) and a variable inductor (VL3) may be connected in parallel at a juncture between a ground and a connected area between the variable resistor (VR1), the variable capacitor (VC1) and the variable inductor (VL1) and the variable resistor (VR2), the variable capacitor (VC2) and the variable inductor (VL2).

The microprocessor (140) may adjust each value of the plurality of variable resistors (VR1, VR2, VR3), the plurality of variable capacitors (VC1, VC2, VC3) and the plurality of variable inductors (VL1, VL2, VL3) to vary each input impedance and each output impedance of the first and second variable impedance matching parts (200, 210).

When the microprocessor (140) may set the impedance of the first variable impedance matching part (200), the strength of the signal received via the antenna (100) must be maintained constant.

To this end, the microprocessor (140) may generate a reception impedance control request signal. The reception impedance control request signal may be converted to an RF signal by the transmitter (130) to be transmitted to a base station (not shown) sequentially via the second variable impedance matching part (210), the duplexer (110) and the antenna (100).

The base station may transmit to a portable mobile communication terminal a reception impedance correction signal for a predetermined period of time in response to the transmitted reception impedance correction signal. For example, the base station may generate a tone signal having a predetermined amplitude and frequency by the reception impedance correction signal, and transmit the generated tone signal to the portable mobile communication terminal for a period of 1~5 ms.

The reception impedance correction signal transmitted by the base station may be received via the antenna (100), and the received reception impedance correction signal may be separated by the duplexer (110) to be transmitted to the receiver (120) via the first variable impedance matching part (200). Successively, the receiver (120) may extract the reception impedance correction signal from the input signal and inputs the signal to the microprocessor (140).

The microprocessor (140) may control the first variable impedance matching part (200) during reception of the reception impedance correction signal to vary the input impedance and the output impedance. Furthermore, the microprocessor (140) may determine the strength of the reception impedance correction signal inputted from the receiver whenever the input and output impedances of the first variable impedance matching part (200) are varied.

If the impedance variation of the first variable impedance matching part (200) has been completed, the microprocessor (140) may detect strongest reception impedance correction signal out of reception impedance correction signals inputted from the receiver (120). The input and output impedances of the first variable impedance matching part (200) may be set a value of varying the impedance of the first variable impedance matching part (200) when the strongest reception impedance correction signal is received.

Then, the output impedance of the duplexer (110) and the input impedance of the first variable impedance matching part (200), and the output impedance of the first variable impedance matching part (200) and the input impedance of the receiver (120) may be mutually matched.

When the impedance of the second variable impedance matching part (210) is to be set, the portable mobile communication terminal may transmit a predetermined signal which is received by a base station to determine the strength of the reception signal.

To this end, the microprocessor (140) may generate a transmission impedance control request signal which is in turn transmitted to the transmitter (130), where the signal may be converted to an RF signal and transmitted to the base station sequentially via the second variable impedance matching part (210), the duplexer (110) and the antenna (100).

The microprocessor (140) may generate a transmission impedance correction signal to be transmitted to the base station. The transmission impedance correction signal may include, for example, a tone signal of predetermined amplitude and frequency and an impedance variable value of the second variable impedance matching part (210) that has been varied when the transmission impedance correction signal was transmitted.

The transmission impedance correction signal generated by the microprocessor (140) may be converted to an RF signal by the transmitter (130) and transmitted to the antenna (100) via the second variable impedance matching part (210) and the duplexer (110) and transmitted to the base station. At this time, the microprocessor (140) may vary the impedance of the second variable impedance matching part (210) in response to the varied impedance value included in the transmission impedance correction signal.

The base station may first receive the transmission impedance control request signal transmitted by the portable mobile communication terminal to determine whether the impedance of the second variable impedance matching part (210) contained in the relevant portable mobile communication terminal has been controlled. Furthermore, the base station may receive the transmission impedance correction signal transmitted by the portable mobile communication terminal to determine the strength of the received transmission impedance correction signals. The base station may match the respectively determined reception strength to the impedance values contained in the received relevant transmission impedance correction signals.

Under this circumstance, if the transmission of the transmission correction signal is completed, the base station may transmit to the relevant portable mobile communication terminal the respectively detected reception strength and impedance values respectively matched to the reception strength.

The reception strength and impedance value transmitted by the base station may be inputted into and received by the receiver (120) via the antenna (100), the duplexer (110) and the first variable impedance matching part (200) of the portable mobile communication terminal, and the received reception strength and the impedance value may be inputted into the microprocessor (140).

The microprocessor (140) may extract the strongest reception strength out of the inputted reception strengths, and the impedance value of the second variable impedance matching part (210) may be set by the impedance value matched to the extracted strongest reception strength.

Successively, the input impedance of the duplexer (110) and the output impedance of the second variable impedance matching part (210), and the input impedance of the second variable impedance matching part (210) and the output impedance of the transmitter (130) may be mutually and accurately matched.

Figure 4:
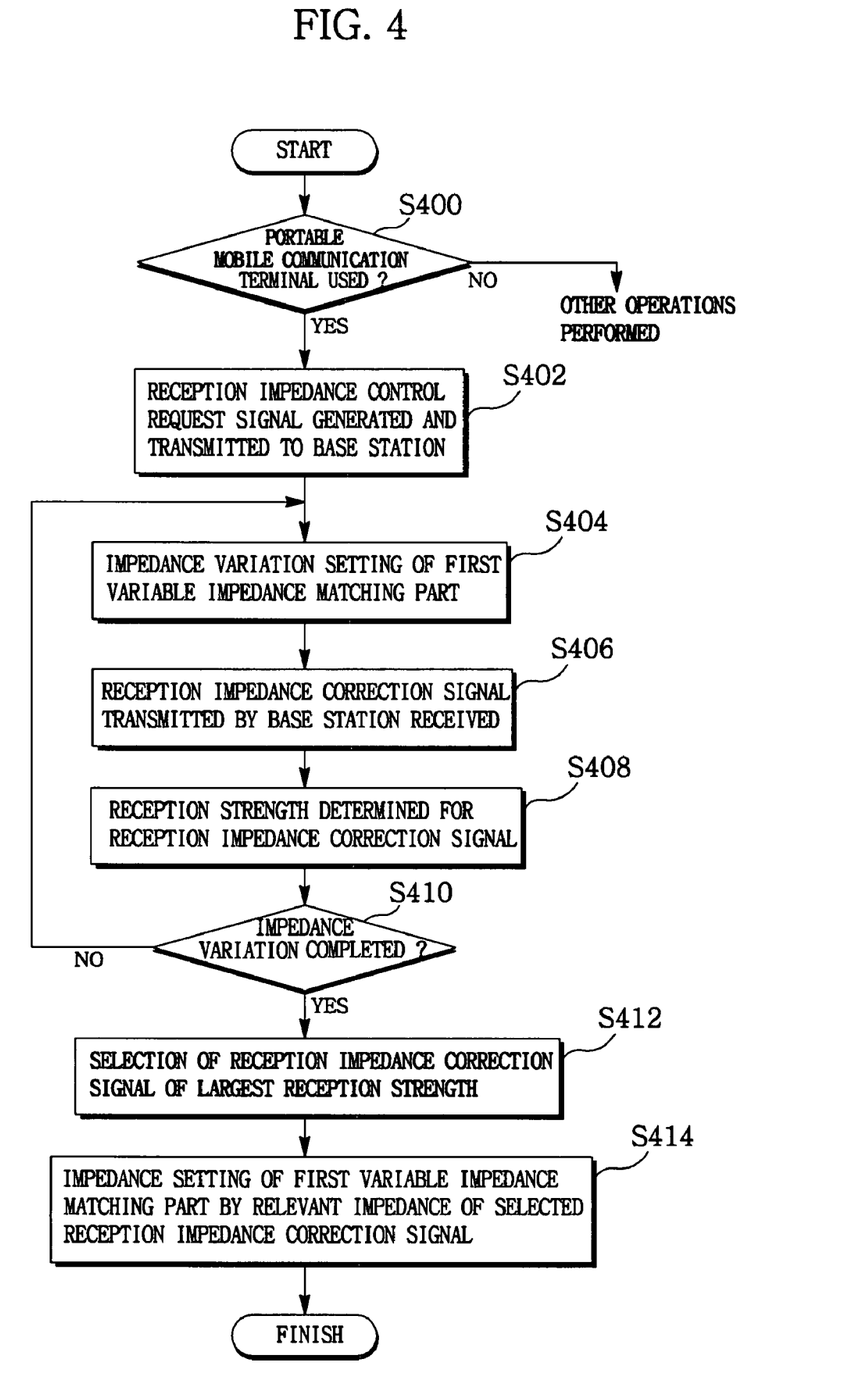
FIG. 4 is a signal flowchart illustrating an operation of impedance setting of a first variable impedance matching part according to an exemplary implementation.

Now, referring to FIG. 4, the microprocessor (140) may determine whether a user intends to use a portable mobile communication terminal (S400). For example, the microprocessor (140) may determine whether the user intends to make a telephone call. The telephone call may include both the transmission and reception of a telephone communication.

If the user intends to use the portable mobile communication terminal, the microprocessor (140) may generate a reception impedance control request signal and output the generated reception impedance control request signal to the transmitter (130) from which the signal is transmitted to a base station (S402).

Successively, the base station may transmit a tone signal having predetermined amplitude and frequency to the reception impedance correction signal in response to the reception impedance control request signal.

The microprocessor (140) may vary the impedance of the first variable impedance matching part (200) (S404), receive the reception impedance correction signal transmitted by the base station via the antenna (100), the duplexer (110), the first variable impedance matching part (200) and the receiver (120) (S406) and determine the reception strength of the received reception impedance correction signal (S408).

The microprocessor (140) may determine whether impedance variation of the first variable impedance matching part (200) has been completed (S410). As a result of the determination, if it is determined that the impedance variation of the first variable impedance matching part (200) has not been completed, the microprocessor (140) may variably set the impedance of the first variable impedance matching part (200) (S404), receive the reception impedance correction signal (S406) and repeat the operation of determining the reception strength (S408).

If the impedance variation of the first variable impedance matching part (200) has been completed, the microprocessor (140) may select a reception impedance correction signal having the largest reception strength out of the determined reception impedance correction signals (S412). The impedance matching of the first variable impedance matching part (200) is set by relevant impedance adjusted when the selected one reception impedance correction signal is received (S414), whereby the output impedance of the duplexer (110) and the input impedance of the first variable impedance matching part (200), and the output impedance of the first variable impedance matching part (200) and the input impedance of the receiver (120) may be mutually and precisely matched.

Figure 5:
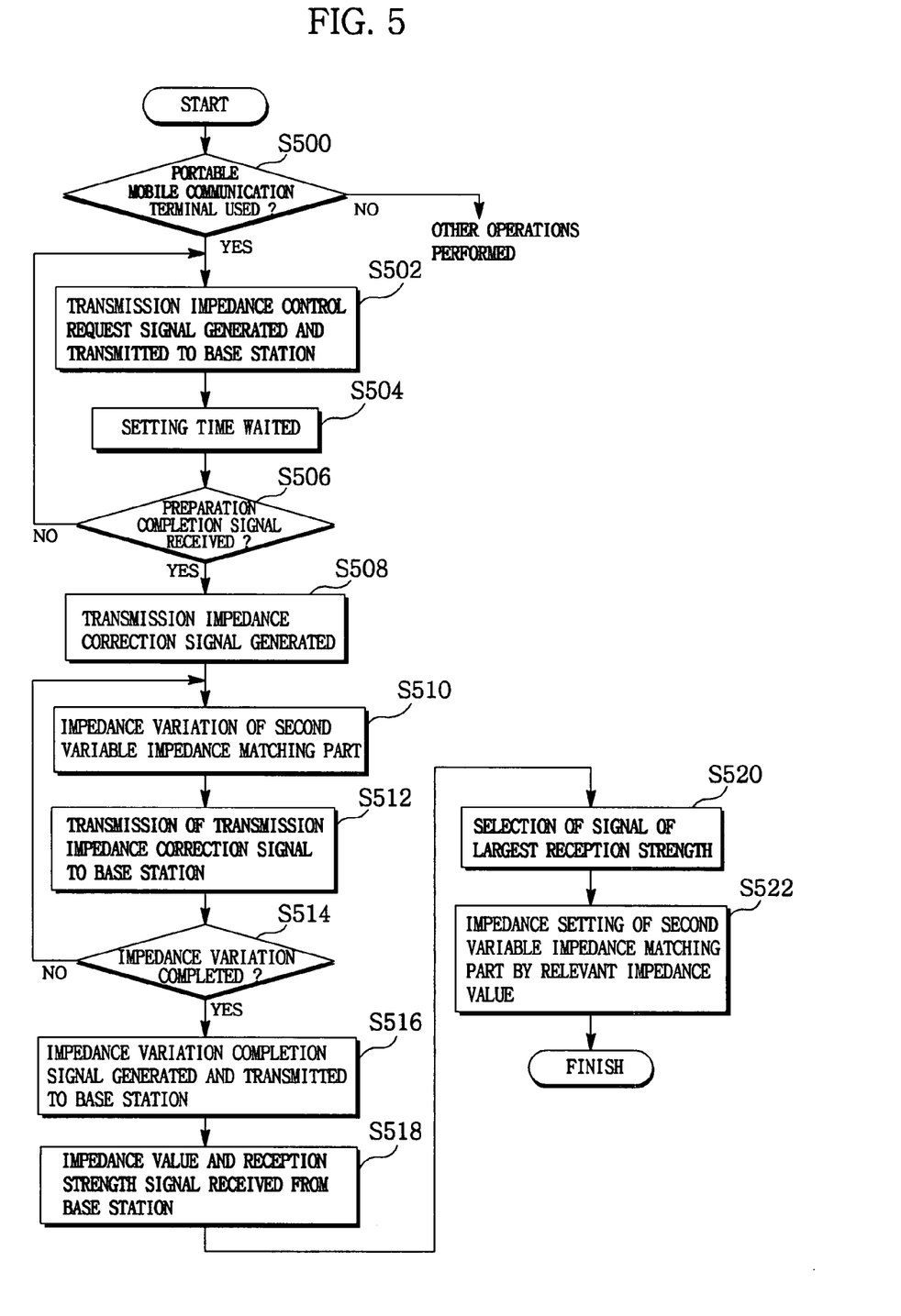
FIG. 5 is a block diagram illustrating an operation of impedance setting of a second variable impedance matching part according to an exemplary implementation.

Referring to FIG. 5 which is a block diagram illustrating an operation of setting an impedance of a second variable impedance matching part (210) according to an exemplary implementation, the microprocessor (140) may determine whether a user intends to use a portable mobile communication terminal (S500).

If the user intends to use the portable mobile communication terminal, the microprocessor (140) may generate a transmission impedance control request signal notifying the adjustment of the transmission impedance. The transmission impedance control request signal may be converted to an RF signal by the transmitter (130) and transmitted to the base station via the second variable impedance matching part (210), the duplexer (110) and the antenna (100) (S502).

Under this circumstance, the microprocessor (140) may wait for a predetermined period of time that may be spent until the transmitted transmission impedance control request signal is received (S504), and determine whether a preparation completion signal for performing the adjustment of the transmission impedance has been received (S506).

As a result of the determination, if it is determined that the preparation completion signal for performing the adjustment of the transmission impedance has not been received, the microprocessor (140) may again transmit the transmission impedance control request signal to the base station (S502), and repeat the operation (S506) of determining whether the preparation completion signal for performing the adjustment of the transmission impedance has been received.

If the preparation completion signal for performing the adjustment of the transmission impedance has been received from the base station, the microprocessor (140) may generate a transmission impedance correction signal (S508). For example, the microprocessor (140) may generate a transmission impedance correction signal that contains a tone signal having predetermined amplitude and frequency and an impedance value for varying the impedance of the second variable impedance matching part (210).

Successively, the microprocessor (140) may vary the impedance of the second variable impedance matching part (210) in response to the impedance value contained in the transmission impedance correction signal (S510), and transmit the generated transmission impedance correction signal to the base station (S512).

If the transmission impedance correction signal has been transmitted to the base station, the microprocessor (140) may determine whether the impedance variation of the second variable impedance matching part (210) has been completed (S514).

As a result of the determination, if it is determined that the impedance variation of the second variable impedance matching part (210) has not been completed, the microprocessor (140) may generate a transmission impedance correction signal (S508), vary the impedance of the second variable impedance matching part (210) responsive to the impedance value contained in the generated transmission impedance correction signal (S510), and repeat an operation (S512) of transmitting relevant transmission impedance correction signal to the base station.

If the portable mobile communication terminal varies the impedance of the second variable impedance matching part (210) to transmit the transmission impedance correction signal to the base station, the base station may receive the transmission impedance correction signal to detect the reception strengths. The base station may match the respective detected reception strengths to the impedance value included in the received relevant transmission impedance correction signal.

As a result of the determination (S514), if the impedance of the second variable impedance matching part (210) has been varied to complete the operation of transmitting the transmission impedance correction signal, the microprocessor (140) may generate an impedance variation completion signal notifying that the impedance variation of the second variable impedance matching part (210) has been completed, and transmit the generated impedance variation completion signal to the base station (S516).

Thereafter, the base station may receive the impedance variation completion signal to determine that the impedance variation has been completed, and transmit the matched reception strengths and the impedance value to the portable mobile communication terminal.

A signal that contains the matched reception strengths and the impedance value transmitted by the base station may be received by the receiver (120) via the antenna (100) of the portable mobile communication terminal, the duplexer (110) and the first variable impedance matching part (200) and inputted to the microprocessor (140) (S518).

The microprocessor (140) may select the largest reception strength out of the received reception strengths (S520), and set the impedance of the second variable impedance matching part (210) by relevant impedance value matched to the selected reception strength (S522).

Therefore, the input impedance of the duplexer (110) and the output impedance of the second variable impedance matching part (210), and the input impedance of the second variable impedance matching part (210) and the output impedance of the transmitter (130) may be mutually and precisely matched.

Figure 6:
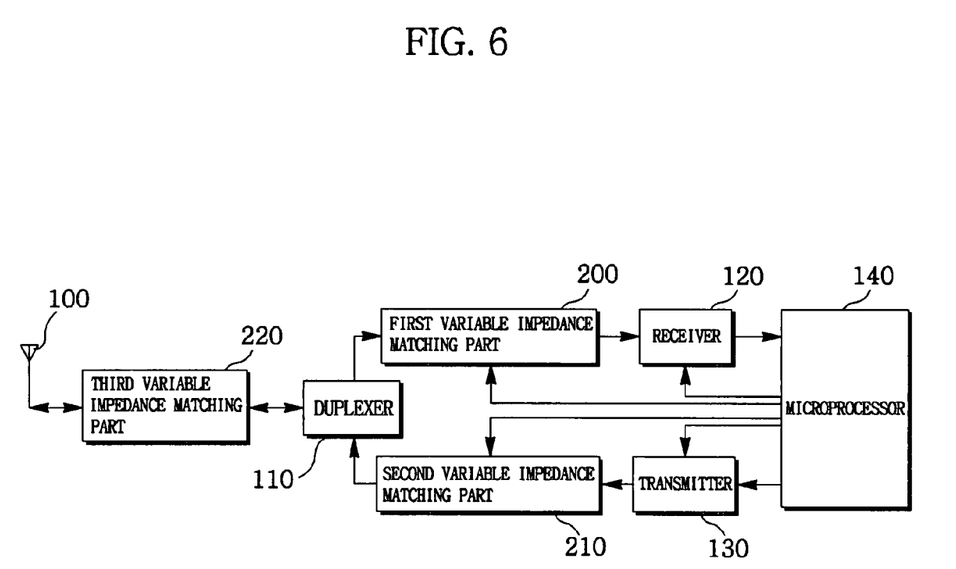
FIG. 6 is a block diagram illustrating a portable mobile communication terminal mounted with an impedance control device according to another exemplary implementation.

Now, referring to FIG. 6, the impedance control apparatus for a portable mobile communication terminal may further include a third variable impedance matching part (220) between the antenna (100) and the duplexer (110). The third variable impedance matching part (220) may be configured in the same manner as in the first and second variable impedance matching parts (200, 210) as shown in FIG. 3 to thereby allow the microprocessor (140) to vary the input and output impedances.

In another general aspect, if the microprocessor (140) set the impedance of the first variable impedance matching part (200), impedance setting of the third variable impedance matching part (220) may be simultaneously performed.

Now, an exemplary implementation of simultaneously setting of impedances of the first and third variable impedance matching parts (200, 220) will be described.

In case the impedances of the first and third variable impedance matching parts (200, 220) are set, the strength of a signal received via the antenna (100) must be stable level-wise.

To this end, the microprocessor (140) may generate a reception impedance control request signal, transmit the generated reception impedance control request signal to the transmitter (130) to allow being converted to an RF signal, and then being transmitted to a base station (not shown) sequentially via the second variable impedance matching part (210), the duplexer (110), the third variable impedance matching part (220) and the antenna (100).

The base station may transmit to a portable mobile communication terminal a reception impedance correction signal having predetermined amplitude and frequency for a predetermined period of time.

The reception impedance correction signal transmitted by the base station is received via the antenna (100) of the portable mobile communication terminal, and the received reception impedance correction signal is inputted to the duplexer (110) via the third impedance variable matching part (220) and separated thereby, and transmitted to the receiver (120) via the first variable impedance matching part (200). Successively, the receiver (120) may extract the reception impedance correction signal from the input signal and input the signal to the microprocessor (140).

The microprocessor (140) may control the first and third variable impedance matching parts (200, 220) to vary the input and output impedances, and determine the strength of reception impedance correction signal inputted from the receiver (120) whenever the input and output impedances of the first and third variable impedance matching parts (200, 220).

If the variation of the input and output impedances of the first and third variable impedance matching parts (200, 220) is completed, the microprocessor (140) may select a reception impedance correction signal of the largest reception strength out of the reception impedance correction signals inputted from the receiver (110). If the selected signal of the largest reception strength is received, input and output impedances of the first and third variable impedance matching parts (200, 220) may be set using the value that has varied the impedances of the first and third variable impedance matching parts (200, 220).

Successively, impedance between the antenna (100) and the third variable impedance matching part (220), impedance between third variable impedance matching part (220) and the duplexer (110), impedance between the duplexer (110) and the first variable impedance matching part (200), impedance between the first variable impedance matching part (200) and the receiver (120) may be mutually and accurately matched in response to the current usage status of the portable mobile communication terminal.

If the setting of the first and third variable impedance matching parts (200, 220) is completed, the impedance of the second variable impedance matching part (210) may be set. At this time, the impedance setting of the second variable impedance matching part (210) is the same as that of the second variable impedance matching part (210) of FIG. 2, such that detailed operation thereto is omitted.

In another exemplary implementation, if the microprocessor (140) performs the impedance setting of the second variable impedance matching part (210), the impedance setting of the third variable impedance matching part (220) may be concurrently conducted.

If the impedance setting of the second and third variable impedance matching parts (210, 220) is performed at the same time, the portable mobile communication terminal must transmit a predetermined signal, and the signal must be received by the base station to determine the strength of the reception signal.

To this end, the microprocessor (140) may generate a transmission impedance control request signal, and transmit the generated transmission impedance control request signal to the transmitter (130) to allow being converted to an RF signal. The signal is transmitted to the base station sequentially via the second variable impedance matching part (210), the duplexer (110), the third variable impedance matching part (220) and the antenna (100).

Furthermore, the microprocessor (140) may generate a transmission impedance correction signal having predetermined amplitude. The transmission impedance correction signal may include a tone signal having predetermined amplitude and frequency, and an impedance value that has varied the impedances of the second and third variable impedance matching parts (210, 220).

The microprocessor (140) may output the generated transmission impedance correction signal to the transmitter (130) to allow being converted to an RF signal, and transmit to the base station sequentially via the second variable impedance matching part (210), the duplexer (110), the third variable impedance matching part (220) and the antenna (100). The microprocessor (140) may vary the impedances of the second and third variable impedance matching parts (210, 220) responsive to the impedance value contained in the transmission impedance correction signal.

The base station may receive the transmission impedance control request signal transmitted by the portable mobile communication terminal to determine the impedance adjustment of the second and third variable impedance matching parts (210, 220) instrinsically disposed inside the portable mobile communication terminal. Furthermore, the base station may receive the transmission impedance correction signals transmitted by the portable mobile communication terminal to determine the reception strength of the received transmission impedance correction signals. The base station may match the determined reception strength to each impedance value contained in relevant transmission impedance correction signals.

If the transmission of the transmission impedance correction signals is completed, the base station may transmit the respective detected reception strength and the impedance value respectively matched to the reception strengths to the relevant portable mobile communication terminal.

The reception strength and impedance value transmitted by the base station may be inputted to the microprocessor (140) sequentially via the antenna (100) of the portable mobile communication terminal, the third variable impedance matching part (220), the duplexer (110), the first variable impedance matching part (200) and the receiver (120).

The microprocessor (140) may extract a largest reception strength out of the inputted reception strengths, and set the impedance value of the second and third variable impedance matching parts (210, 220) by the impedance value matched to the extracted reception strength. For that reason, impedance between the antenna (100) and the third variable impedance matching part (220), impedance between the third variable impedance matching part (220) and the duplexer (110), impedance between the duplexer (110) and the second variable impedance matching part (210) and impedance between the second variable impedance matching part (210) and the transmitter (130) may be mutually and accurately matched in response to the current use status of the portable mobile communication terminal.

If the setting of the second and third variable impedance matching parts (210, 220) is thus completed, the impedance of the first variable impedance matching part (200) may be set. At this time, the impedance setting of the first variable impedance matching part (200) is the same as that of the first variable impedance matching part (200) of FIG. 2, such that a detailed operation thereto is omitted.

Figure 7:
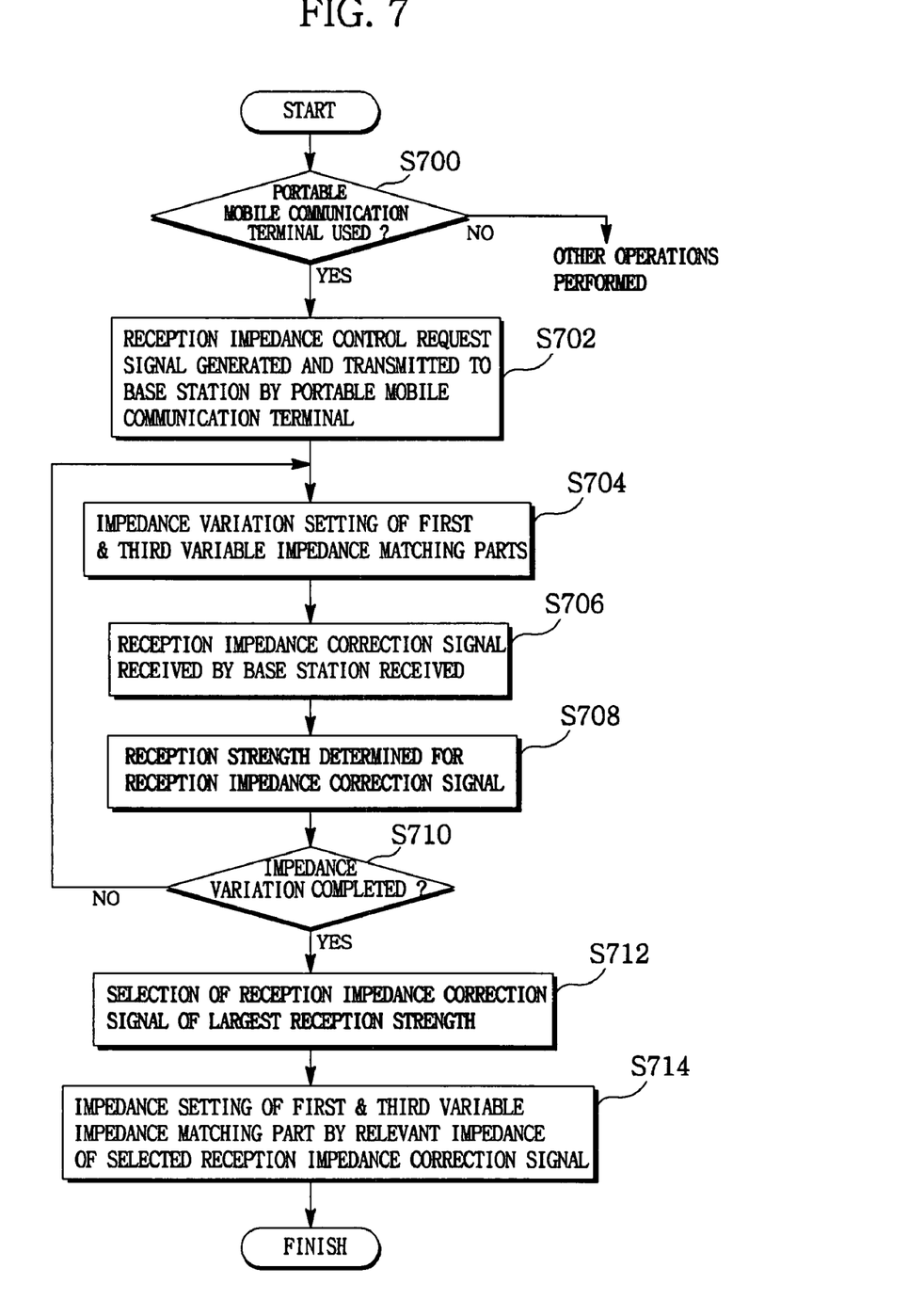
FIG. 7 is a signal flowchart illustrating an operation of impedance setting of first and third variable impedance matching parts according to another exemplary implementation.

FIG. 7 is a signal flowchart illustrating an operation of setting impedances of first and third variable impedance matching parts according to another exemplary implementation.

Now, referring to FIG. 7, the microprocessor (140) may determine whether a user intends to use the portable mobile communication terminal (S700). For example, the microprocessor (140) may determine whether the user intends to make a telephone call.

If the user intends to use the portable mobile communication terminal, the microprocessor (140) may generate a reception impedance control request signal and output the generated reception impedance control request signal to the transmitter (130) from which the signal is transmitted to a base station (S702). Thereafter, the base station may transmit the reception impedance correction signal to a relevant portable mobile communication terminal for a predetermined period of time.

The microprocessor (140) may vary the impedances of the first and third variable impedance matching parts (200, 220) (S704), receive the reception impedance correction signal transmitted by the base station and determine the reception strength of the reception impedance correction signal received when the impedances of the first and third variable impedance matching parts (200, 220) are varied (S708).

Next, the microprocessor (140) may determine whether impedance variation of the first and third variable impedance matching parts (200, 220) have been completed (S710). As a result of the determination, if it is determined that the variation of the impedances of the first and third variable impedance matching parts (200, 220) has not been completed, the microprocessor may vary the impedances of the first and third variable impedance matching parts (200, 220), and repeat the operation of determining the strength by receiving the reception impedance correction signal.

Furthermore, if the impedance variation of the first and third variable impedance matching parts (200, 220) has been completed, the microprocessor (140) may select a reception impedance correction signal with the largest reception strength out of the determined reception strengths of the reception impedance correction signal (S712). Successively, the impedance setting of the first and third variable impedance matching parts (200, 220) may be performed by the relevant impedance of the selected reception impedance correction signal to mutually match an impedance between the antenna (100) and the third variable impedance matching part (220), an impedance between the third variable impedance matching part (220) and the duplexer (110), an impedance between the duplexer (110) and the first variable impedance matching part (200), and an impedance between the first variable impedance matching part (200) and the receiver (120) (S714).

Once the impedance between the first and third variable impedance matching parts (200, 220) is matched, the impedance of the second variable impedance matching part (210) may be matched. The impedance matching of the second variable impedance matching part (210) is the same as that of FIG. 5, such that no detailed explanation will be given again.

Figure 8:
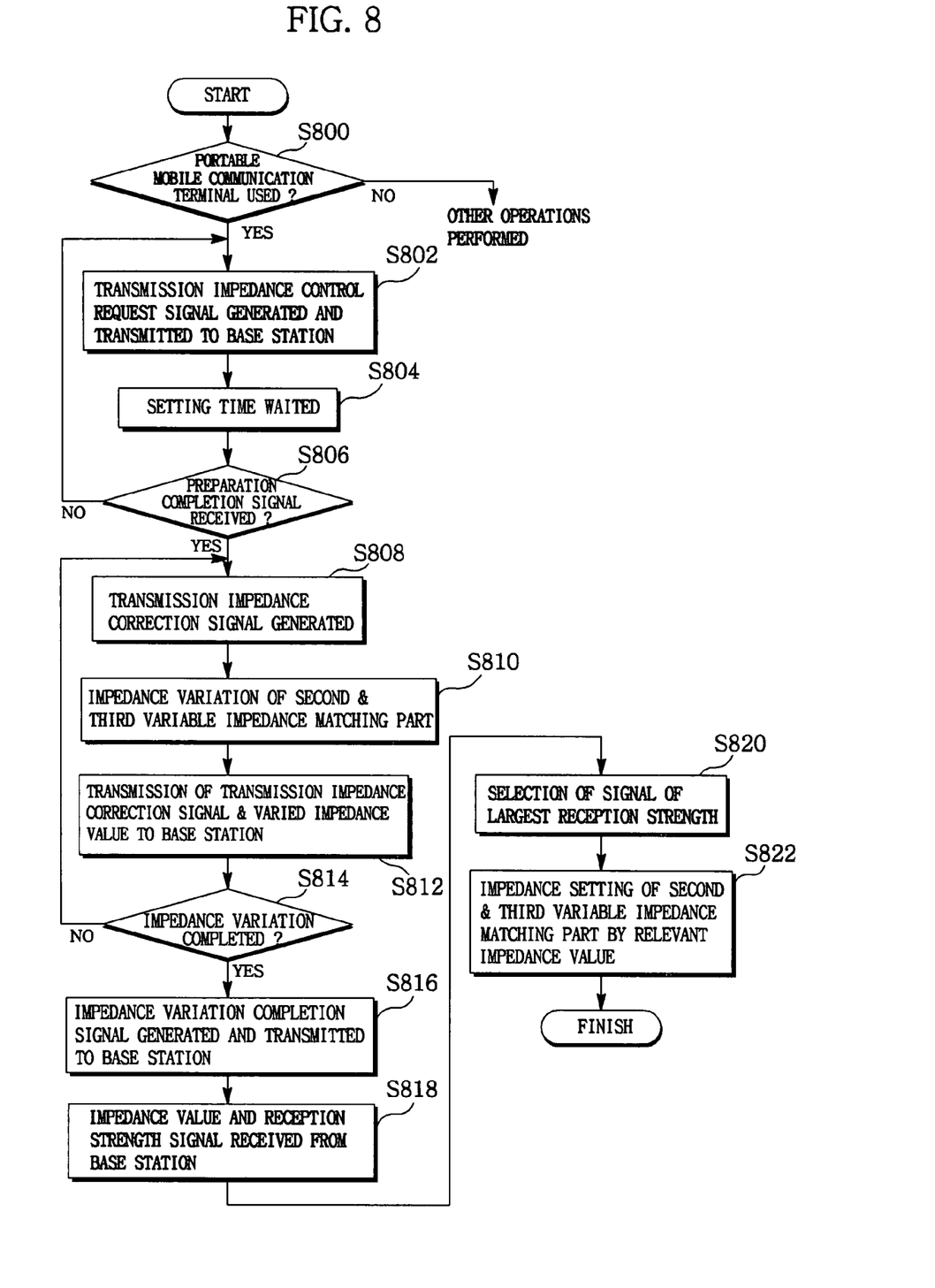
FIG. 8 is a signal flowchart illustrating an operation of impedance setting of second and third variable impedance matching parts according to another exemplary implementation.

FIG. 8 is a signal flowchart illustrating an operation of impedance setting of second and third variable impedance matching parts (210, 220) according to another exemplary implementation.

Referring now to FIG. 8, the microprocessor (140) may determine whether a user intends to use the portable mobile communication terminal (S800).

If the user intends to use the portable mobile communication terminal, the microprocessor (140) may generate a reception impedance control request signal and output the generated reception impedance control request signal to the transmitter (130) from which the signal is transmitted to a base station (S802).

Under this circumstance, the microprocessor (140) may wait for a predetermined period of time that may be spent until the transmitted transmission impedance control request signal is received (S804), and determine whether a preparation completion signal for performing the adjustment of the transmission impedance has been received (S806).

As a result of the determination, if it is determined that the preparation completion signal for performing the adjustment of the transmission impedance has not been received, the microprocessor (140) may again transmit the transmission impedance control request signal to the base station, and repeat the operation of determining whether the preparation completion signal for performing the adjustment of the transmission impedance has been received.

If the preparation completion signal for performing the adjustment of the transmission impedance has been received from the base station, the microprocessor (140) may generate a transmission impedance correction signal (S808). At this time, the transmission impedance correction signal contains, for example, a tone signal having predetermined amplitude and frequency and impedance values of the second and third variable impedance matching parts (210, 220) varied when the transmission impedance correction signal was transmitted.

Successively, the microprocessor (140) may vary the impedances of the second and third variable impedance matching parts (210, 220) (S810), and transmit the transmission impedance correction signal that contains the varied impedance values of second and third variable impedance matching parts (210, 220) to the base station (S812) to determine whether the impedance variation of the second and third variable impedance matching parts (210, 220) has been completed (S814).

As a result of the determination, if it is determined that the impedance variation of the second and third variable impedance matching parts (210, 220) has not been completed, the microprocessor (140) may vary the impedances of the second and third variable impedance matching parts (210, 220) (S810), and repeat an operation (S812) of transmitting relevant transmission impedance correction signal containing the varied impedance values of the second and third variable impedance matching parts (210, 220) to the base station.

If the portable mobile communication terminal varies the impedances of the second and third variable impedance matching parts (210, 220) to transmit the transmission impedance correction signal to the base station, the base station may receive the transmission impedance correction signal to detect the reception strengths. The base station may match the respective detected reception strengths to relevant impedance value included in the transmission impedance correction signal.

As a result of the determination, if the impedance variation of the second and third variable impedance matching parts (210, 220) has been completed, the microprocessor (140) may generate an impedance variation completion signal notifying that the impedance variation of the second and third variable impedance matching parts (210, 220) has been completed, and transmit the generated impedance variation completion signal to the base station (S816).

Thereafter, the base station may receive the impedance variation completion signal to determine that the impedance variation has been completed, and transmit signals of the matched impedance values and reception strengths to the portable mobile communication terminal.

The signals that contain the matched reception strengths and the impedance values transmitted by the base station may be received by the receiver (120) via the antenna (100) of the portable mobile communication terminal, the duplexer (110), the first variable impedance matching part (200) and the third variable impedance matching part (220), and inputted to the microprocessor (140) (S818).

The microprocessor (140) may then select the largest reception strength out of the received reception strengths (S820), and set the impedances of the second and third variable impedance matching parts (210, 220) by relevant impedance value matched to the selected reception strength (S822), whereby, the impedances between the antenna (100) and the third variable impedance matching part (220), the impedance between the duplexer (110) and the third variable impedance matching part (220), the impedance between the duplexer (110) and the second variable impedance matching part (210) and impedance between the second variable impedance matching part (210) and the transmitter (130) may be mutually and precisely matched.

Once the impedance matching between the second and third variable impedance matching parts (210, 220) is completed, the impedance of the first variable impedance matching part (200) may be matched. The impedance matching of the first variable impedance matching part (200) is the same as that of FIG. 4, such that detailed explanation of operation thereto is omitted.

While the present novel concept has been shown and described with reference to certain exemplary implementations thereof, it will be understood by those skilled in the art that various changes in form and details may be made therein without departing from the spirit and scope of the invention as defined by the appended claims and their equivalents.

What is claimed is:

1. An impedance control method for a portable mobile communication terminal, the method comprising:
   varying, by a microprocessor, an impedance of a first variable impedance matching part to set the impedance of the first variable impedance matching part in response to a reception impedance correction signal received from a base station; and
   varying, by the microprocessor, an impedance of a second variable impedance matching part to transmit a transmission impedance correction signal to a base station and setting the impedance of the second variable impedance matching part in response to a signal returned from the base station,
   wherein the step of performing the impedance setting of the first variable impedance matching part comprises:
      varying, by the microprocessor, the impedance of the first variable impedance matching part to receive reception impedance correction signals and to determine a reception strength;
      selecting the reception impedance correction signal having a strongest strength out of the received reception impedance correction signals; and
      setting the impedance of the first variable impedance matching part by a relevant impedance when the selected reception impedance correction signal is received, and
   wherein the impedance setting of the second variable impedance matching part comprises:
      varying, by the microprocessor, the impedance of the second variable impedance matching part and transmitting the transmission impedance correction signal containing a varied impedance value to the base station;
      receiving the impedance value and the reception strength from the base station when the impedance variation of the second variable impedance matching part is completed; and
      performing the impedance setting of the second variable impedance matching part in response to the received reception strength and impedance value.

2. The method as claimed in claim 1, wherein the impedance setting of the first and second variable impedance matching parts is performed when a use of the portable mobile communication terminal is detected.

3. The method as claimed in claim 1, wherein the reception impedance correction signal is transmitted by the base station to the portable mobile communication terminal when the microprocessor generates a reception impedance control request signal and transmits the reception impedance control request signal to the base station.

4. The method as claimed in claim 1, wherein the transmission of the transmission impedance correction signal is performed when a preparation completion signal is received from the base station in response to a transmission impedance control request signal and the microprocessor generates the transmission impedance control request signal and transmits the transmission impedance control request signal to the base station.

5. The method as claimed in claim 1, wherein the impedance setting of the second variable impedance matching part is performed in such a manner that the reception strength having a largest value is selected among received reception strengths, and setting the impedance by a relevant impedance value matched by the selected reception strength.

6. An impedance control method for a portable mobile communication terminal comprising:
   varying, by a microprocessor, impedances of first and third variable impedance matching parts to determine a reception strength of a received reception impedance correction signal, and to set impedances of the first and third variable impedance matching parts; and
   varying, by the microprocessor, an impedance of the second variable impedance matching part to transmit a transmission impedance correction signal to a base station, and to set the impedance of the second variable impedance matching part in response to a signal returned from the base station,
   wherein the step of impedance setting of the first and third variable impedance matching parts comprises:
      varying by the microprocessor, the impedances of the first and third variable impedance matching parts to receive the reception impedance correction signals and to determine the reception strength;
      selecting the reception correction signal having the largest strength out of received reception impedance correction signals; and
      setting the impedances of the first and third variable impedance matching parts by a relevant impedance when the selected reception impedance correction signal is received, and
   wherein the step of impedance setting of the second variable impedance matching part comprises:
      varying, by the microprocessor, the impedance of the second variable impedance matching part and transmitting the transmission impedance correction signal containing a varied impedance value to the base station;
      receiving the impedance value and the reception strength from the base station when the impedance variation of the second variable impedance matching part is completed; and
      performing the impedance setting of the second variable impedance matching part in response to the received reception strength and impedance value.

7. The method as claimed in claim 6, wherein the impedance setting of the first and third variable impedance matching parts and of the second variable impedance matching part is performed when a use of the portable mobile communication terminal is detected.

8. The method as claimed in claim 6, wherein the reception impedance correction signal is transmitted by the base station to the portable mobile communication terminal when the microprocessor generates a reception impedance control request signal and transmits the reception impedance control request signal to the base station.

9. The method as claimed in claim 6, wherein the transmission of the transmission impedance correction signal is performed when a preparation completion signal is received from the base station in response to a transmission impedance control request signal and the microprocessor generates the transmission impedance control request signal and transmits the transmission impedance control request signal to the base station.

10. The method as claimed in claim 6, wherein the impedance setting of the second variable impedance matching part is performed in such a manner that the reception strength having the having a largest value is selected among received reception strengths, and setting the impedance by a relevant impedance value matched by the selected reception strength.

11. An impedance control method for a portable mobile communication terminal, the method comprising:
  varying, by a microprocessor, impedances of second and third variable impedance matching parts to transmit a transmission impedance correction signal to a base station and to set the impedances of the second and third variable impedance matching parts in response to a signal returned from the base station; and
  varying, by the microprocessor, the impedance of a first variable impedance matching part to set the impedance of the first variable impedance matching part in response to a received reception strength of a reception impedance correction signal,
  wherein the impedance setting step of the second and third variable impedance matching parts comprises:
    varying, by the microprocessor, the impedances of the second and third variable impedance matching parts and transmitting the transmission impedance correction signal containing a varied impedance value to the base station;
    receiving the impedance value and reception strength from the base station when the impedance variation of the second and third variable impedance matching parts is completed; and
    performing the impedance setting of the second and third variable impedance matching parts in response to the received reception strength and the impedance value, and
  wherein the impedance setting step of the first variable impedance matching part comprises:
    varying, by the microprocessor, the impedances of the second and third variable impedance matching parts to receive the reception impedance correction signals and to determine the reception strength;
    selecting the reception correction signal having a largest strength out of received reception impedance correction signals; and
    setting the impedance of the first variable impedance matching part by a relevant impedance when the selected reception impedance correction signal is received.

12. The method as claimed in claim 11, wherein the step of the impedance setting of the second and third variable impedance matching parts and that of the first variable impedance matching part are performed when a use of the portable mobile communication terminal is detected.

13. The method as claimed in claim 11, wherein the transmission of the transmission impedance correction signal is performed when a preparation completion signal is received from the base station in response to a transmission impedance control request signal and the microprocessor generates the transmission impedance control request signal and transmits the transmission impedance control request signal to the base station.

14. The method as claimed in claim 11, wherein the impedance setting of the second and third variable impedance matching parts is performed in such a manner that the reception strength having a largest value is selected among received reception strengths, and setting the impedance by a relevant impedance value matched by the selected reception strength.

15. The method as claimed in claim 11, wherein the reception impedance correction signal is transmitted by the base station to the portable mobile communication terminal when the microprocessor generates a reception impedance control request signal and transmits the reception impedance control request reception impedance control request signal to the base station.

* * * * *